, 1992

United States Patent [19]

Feijen et al.

[11] Patent Number: 5,092,381
[45] Date of Patent: Mar. 3, 1992

[54] POLYESTER INDUSTRIAL YARN AND ELASTOMERIC OBJECTS REINFORCED WITH SAID YARN

[75] Inventors: Henricus H. W. Feijen, Velp; Karl A. Weigand, Eefde, both of Netherlands

[73] Assignee: Akzo NV, Arnhem, Netherlands

[21] Appl. No.: 267,672

[22] Filed: Nov. 3, 1988

Related U.S. Application Data

[62] Division of Ser. No. 847,066, Apr. 1, 1986, Pat. No. 4,867,925.

[30] Foreign Application Priority Data

Apr. 4, 1985 [NL] Netherlands .......................... 8501019

[51] Int. Cl.$^5$ ............................................. D01F 8/14
[52] U.S. Cl. ....................... 152/451; 57/243; 57/244; 57/250; 428/221; 428/224; 428/295; 428/373
[58] Field of Search ............... 264/171, 211, 210.6, 264/210.8, 211.14, 211.13, DIG. 26, 136, 137, 210.2, 211.12, 129; 428/373, 374, 379, 221, 224, 295; 152/451; 57/243, 244, 250

[56] References Cited

U.S. PATENT DOCUMENTS

| | | | |
|---|---|---|---|
| 3,570,235 | 3/1971 | Fukuhara et al. | 28/72 |
| 3,595,738 | 7/1971 | Clarke et al. | 428/362 |
| 3,963,678 | 6/1976 | Conrad et al. | 260/75 T |
| 4,134,882 | 1/1979 | Frankfort et al. | 528/309 |
| 4,195,051 | 3/1980 | Frankfort et al. | 264/210.2 |
| 4,415,726 | 11/1983 | Tanji et al. | 528/272 |
| 4,473,617 | 9/1984 | van Leeuwen et al. | 264/171 |

FOREIGN PATENT DOCUMENTS

| | | |
|---|---|---|
| 0080906 | 3/1983 | European Pat. Off. . |
| 3207826 | 3/1981 | Fed. Rep. of Germany . |
| 3226346 | 7/1981 | Fed. Rep. of Germany . |
| 0442504 | 10/1966 | Japan . |
| 0021170 | 9/1969 | Japan . |
| 0088678 | 7/1977 | Japan . |
| 0149513 | 3/1981 | Japan . |
| 0104221 | 12/1981 | Japan . |
| 0066507 | 4/1984 | Japan . |
| 0144615 | 8/1984 | Japan . |
| 0066508 | 9/1984 | Japan . |
| 6512920 | 11/1965 | Netherlands . |
| 1006136 | 12/1962 | United Kingdom . |
| 1087939 | 10/1967 | United Kingdom . |
| 1157433 | 7/1969 | United Kingdom . |
| 1179615 | 1/1970 | United Kingdom . |
| 1247774 | 9/1971 | United Kingdom . |
| 1590637 | 6/1981 | United Kingdom . |

*Primary Examiner*—Hubert C. Lorin
*Attorney, Agent, or Firm*—Louis A. Morris

[57] ABSTRACT

A substantially polyester drawn filament yarn composed of at least 15 filaments having a core zone surrounded by a sheath zone, said filaments having
a. a linear density of at least decitex 70;
b. a tenacity of 735–1,000 mN/tex;
c. a specific 5%-LASE higher than 375 mN/tex;
d. a hot air shrinkage measured at 160° C. of 0.5–3.7%;
e. an average relative viscosity of 1.700 to 2.200; and
f. an elongation at rupture of 5 to 20 percent, and a cord, a shaped elastomeric object, a tire, a sewing yarn, a seat belt, and a tow rope composed of the yarn.

7 Claims, 3 Drawing Sheets

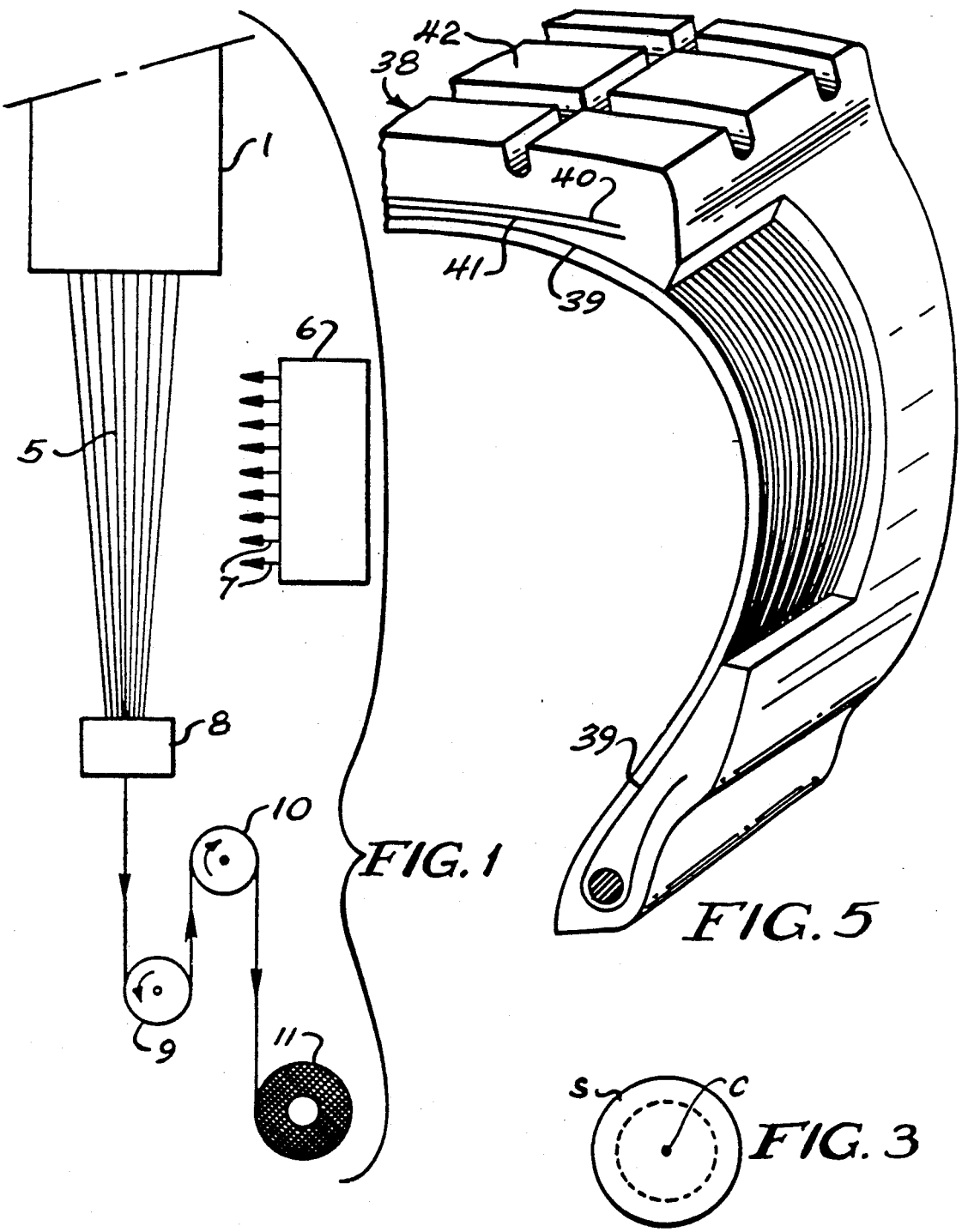
FIG. 1
FIG. 5
FIG. 3
FIG. 4

POLYESTER INDUSTRIAL YARN AND ELASTOMERIC OBJECTS REINFORCED WITH SAID YARN

This is a division of application Ser. No. 847,066 filed Apr. 1, 1986, now U.S. Pat. No. 4,867,925.

Process for the manufacture of polyester industrial yarn and cord made from said yarn and elastomeric objects reinforced with said cord.

The invention relates to a process for the manufacture of a substantially polyester multifilament yarn of the type which is destined for industrial uses and has a tenacity of at least 500 mN/tex, which process comprises the succesive steps of extruding a stream of molten polymer through a large number of spinning orifices, cooling the spun filament bundle, optionally drawing the filaments and finally collecting them, use being made of a spinning speed higher than 450 m/min, the relative viscosity of the polymer stream in the core zone in each of the spinning orifices being higher than in the sheath zone surrounding said core zone.

A process of the type indicated above is known. In actual practice the industrial yarns referred to here are applied on a large scale for various purposes, such as reinforcing elastomeric objects, including pneumatic tires for vehicles and conveyor belts, transmission belts, ropes, sewing yarns, etc. The multifilament yarns are always composed of a large number of, say, 15 to 1000 filaments. Although each of these filaments have a high tenacity, they each have only a low breaking strength because of their small thickness or low individual linear density. Because of its high total linear density of, say, decitex 300 to 2500, a bundle of multifilaments or a multifilament yarn has a sufficiently high breaking strength. As a result, the use in actual practice of multifilament yarns for the above industrial uses is restricted to a form in which a sufficiently high coherence is imparted to yarn, particularly by twisting or entangling. Moreover, generally two or more twisted yarns are further combined into a cord or skein. All the above uses have in common that the filaments contained therein are in a rather strongly bent state. As is usual in the case of bicomponent filaments subject to bending loads, the outermost "fibres" in the sheath zone of the filaments are subject to the highest bending forces and the filaments of the core zone to considerably lower bending forces. The difference between loading applied to the core and the sheath of the filaments becomes even more important in actual practice, where instead of a static bending load there often occurs a dynamic or strongly fluctuating bending load, as for instance in the case of reinforcing cords in automobile tires and transmission belts.

It should be added that in the case of multifilament yarns even at moderate spinning speeds of, say, about 1500 m/min., but particularly at high spinning speeds the physical properties measured across the cross-section of each filament may differ. For, as a result of relatively rapid cooling of the filaments on their outsides the orientation of the molecules on the outside of each filaments is greater than in their core. For it appears that across the cross-section of each of the filaments the birefringence in the sheath zone is greater than in the core zone. And transversely of the longitudinal direction of each filament the birefringence gradually decreases to its lowest value in the core of the filament. In actual practice the filaments may consequently be underloaded in their core and overloaded in their sheath, which may still be augmented when they are subject to a bending load. Therefore, the actually favourable properties of the yarns are not taken full advantage of. As is generally known, this leads in actual practice to cord losses during twisting, limited cord efficiency and laying losses during rope manufacture and limited resistance of the cords to fluctuating loading, as appears in the "Mallory Tube Fatigue Test". These drawbacks to multifilament yarn for industrial uses have not entirely been overcome yet, which situation can yet be improved upon. Moreover, with respect to polyester yarns for industrial uses there has for several years been a trend to increase the conventional spinning speeds from 500–900 m/min to 1600–2000 m/min or higher, resulting in a more or less pre-oriented yarn. The spinning process and the drawing process are incidentally combined then into an integrated spindrawing process. In the processes for spinning polyester yarns for textile uses, such as clothing, the change over to higher spinning speeds of 1600–5000 m/min has already been introduced in actual practice on a larger scale. As with yarns for textile uses particularly the total linear density of the manufactural filament yarns is relatively low, for instance: decitex 50–150, and also the relative viscosity of the yarn obtained is low, for instance: $\eta_{rel}=1.580$, the use of higher spinning speeds does not give rise to a great many problems. Further, because of the low total linear density of the yarn the industry is for economical reasons more or less obliged to change over to higher spinning speeds in the manufacture of polyester yarns for textile uses in view of the attendant higher output per spinning assembly. It is known that in meltspun yarns orientation of the molecules must take place in order to obtain a yarn suitable for practical use. At low spinning speeds of, say, 700 m/min orientation is effected mainly by drawing the yarn. Textile yarns obtained at low spinning speeds can be drawn generally at a ratio of as low as 3–4, whereas industrial yarns, which have a higher relative viscosity, which in the case of polyethylene terephthalate is $\eta_{rel}=1.880$, must be drawn at a ratio of 5–6 in order to obtain the physical properties desired in actual practice, such as tenacity, 5%-LASE value or elongation at rupture. The higher the spinning speed, the higher will be the degree of molecular orientation of the yarn obtained. To obtain the desired physical properties yarns obtained at high spinning speeds can be drawn at a far lower ratio of, say, 2 or 3. For a detailed consideration of the effect of spinning speed on the physical properties of polyethylene terephthalate yarns reference is made to the discussions by H. M. Heuvel and R. Huisman on pp. 295–331 in "High speed fibre spinning. Science and Engineering Aspects", edited by Andrzej Ziabicki and Hiromichi Kawai, Copyright 1985 by Wiley & Sons, Inc. New York.

Considering that the manufacture at spinning speeds of up to 6000 m/min of light textile yarns which are preoriented during spinning, which yarns are used for garments and subjected to texturing processes, has for quite a long time been practiced on a commercial scale, it is in principle obvious also to change over to spinning speeds of up to 6000 m/min in the case of the heavier industrial yarns of the type as used for reinforcing vehicle tires. It has been found, however, that when these spinning speeds are used for industrial yarns, the completed yarn, which may optionally be afterdrawn at a particularly desired ratio, displays physical properties which in some respects considerably differ from those of the yarns produced at a conventional speed. For example, the shrinkage measured in hot air at 160° C. of the completed, drawn polyester industrial yarn will decrease with increasing the spinning speed to 6000 m/min. But this happens to be of particular advantage because then also the cords made from these yarns and generally provided with a dip to promote the adhesion to elastomeric material will have a lower shrinkage. It is of particular importance that in the case of the cord from the industrial yarns produced at high speeds a lowest possible shrinkage is obtained at one and the same high modulus. A high modulus/shrinkage ratio, also referred to as high dimensional stability, is of great importance with respect to the use of reinforcing cord in vehicle tires and plays an important role both in the manufacturing process of the tire and as far as the quality and the behaviour of the tire on the road is concerned. In view of these last-mentioned properties the most suitable high-speed spun or spindrawn polyester tire yarns are of the HMLS type (High Modulus, Low Shrinkage). However, the well-known processes of spindrawing or high-speed spinning, viz. at 1600–6000 m/min, of industrial polyester filament yarn have the disadvantage that the breaking strength of the yarn and of the dipped cord will decrease considerably below that of yarn obtained at low spinning speed and of that of the cord manufactured from it. As the practical use of these industrial yarns is largely based on their high tenacity, the phenomenon of the decrease in breaking strength, also of the drawn yarn and of the cord made from it, at spinning speeds of 1600 m/min or higher has so far formed a considerable drawback to the use in actual practice of higher spinning speeds in the manufacture of polyester industrial yarns.

The invention has for its object to provide a process of the type indicated above for the manufacture of a polyester multifilament yarn for industrial uses. The present process no longer displays the afore-mentioned drawbacks, such as the adverse variation in molecular orientation across the cross-section of each of the filaments and the ensuing loss of strength. And the favourable high modulus and low hot air shrinkage and hence the high modulus/shrinkage ratio are retained. According to the invention the process of the type indicated above is characterized in the first place in that in each spinning orifice the difference in relative viscosity, measured on the spun product, between the core and the sheath zone is less than 0.100, more particularly 0.080 to 0.003, but preferably about 0.040 to 0.003 or 0.040 to 0.010. Surprisingly, it has been found that a distinctly lower loss of strength occurs with increasing spinning speeds. Moreover, higher spinning speeds are attended with a decreasing difference in molecular orientation between the core and the sheath in each of the filaments. According to the invention the spinning speed is advantageously in the range of 1600 to 6000 m/min, preferably about 4000 m/min. It should be noted that by the term spinning speed as used in the present application is to be understood the circumferential speed of the first driven yarn advancing roll which is positioned downstream of the spinning assembly. However, if in the spinning operation no use is made of a driven yarn advancing roll between the winding unit and the spinneret, then the winding speed is taken as the spinning speed. The process according to the invention is characterized particularly in that the polyester used is polyethylene terephthalate having a relative viscosity, measured on the spun product, of 1.700 to 2.200, preferably about 1.900. Further, the process according to the invention is characterized in that the polyester material used in the core zone and in the sheath zone is built up of substantially the same structural units. By a yarn substantially formed of polyester is to be understood here a yarn comprising more than 85 per cent by weight of ethylene terephthalate units.

A preferred embodiment according to the invention is characterized in that in each spinning orifice the core zone and the sheath zone in the polymer stream extend for a particular radial distance and are concentrical, the core zone extending radially outwards from the centre of the polymer stream and the sheath zone extending radially inwards from the outer circumference of the polymer stream.

A simple embodiment of the process according to the invention is characterized in that in each spinning orifice the relative viscosity of the molten polymer decreases in one or more steps from the centre of the polymer stream towards its outer circumference.

An effective embodiment in which use is made of a stream of molten polymer of one particular relative viscosity is characterized according to the invention in that said polymer stream is divided into two or more part-streams which are subjected to such different treatments, for instance as far as heating and/or residence time are concerned, as will result in a difference in relative viscosity between said part-streams. Use being made of a stream of molten polymer of one and the same particular relative viscosity, the process according to the invention also may be advantageously characterized in that said polymer stream is divided into two or more part-streams and at least one part-stream is provided with some additive, such as polyglycol, as a result of which there will be a difference in relative viscosity between the one part-stream and the other polymer stream. In some circumstances the process according to the invention also may be realized in a simple manner if it is characterized in that the difference in relative viscosity in the polymer stream in each of the spinning orifices is brought about by joining two or more polymer streams of a polymer of virtually the same chemical composition, but of different relative viscosities, which are each fed to the spinning assembly through a separate extruder.

The process according to the invention can be realized in a particularly practical manner by having said difference in relative viscosity brought about in the heated spinning assembly. According to the invention the process is with advantage so carried out that of the polymer flowing through the spinning assembly the residence time and/or the temperature of the one part of the polymer stream which is to form the core zone with higher relative viscosity differs from the residence time and/or the temperature of the other part of the polymer stream which is to form the sheath zone with lower relative viscosity. The invention also comprises an apparatus for carrying out the process according to the invention. The invention notably comprises the spinning assembly represented in FIG. 2, by which the process according to the invention may be realized in an extremely simple manner.

Particularly favourable results have been obtained using a process which is characterized according to the invention in that the spinning process is carried out with the aid of a spinning assembly which is at least partly of the type for spinning multifilament bicomponent yarns of the sheath-core type, part of the polymer stream of a higher relative viscosity being fed to the centre of each spinning orifice through the channels for forming a filament core and part of the polymer stream of a lower relative viscosity being fed through the channels for forming a filament sheath.

After the filament bundle has passed through the spinning orifices, it may optionally be guided through a hot tube. The invention particularly relates to a multifilament yarn obtained according to the invention and preferably formed of polyethylene terephthalate, which yarn is characterized in that the completed, drawn multifilament yarn, which is composed of at least 15 filaments, preferably 15–1000 filament, has a linear density of at least decitex 70, preferably decitex 300 to 2500, and has the following properties:
tenacity 500 to 1000 mN/tex;
specific 5%-LASE 150 to 600 mN/tex;
elongation at rupture 5 to 20%, more particularly 7–17%, preferably about 9.5%;
hot air shrinkage 0.5 to 8%, measured at 160° C., preferably 0.5–3.7%;
average relative viscosity of the spun filaments 1.700–2.200, preferably about 1.900.

The process according to the invention is advantageously characterized in that before drawing the yarn it is treated with an agent, such as epoxy groups-containing compounds or blocked isocyanate groups- and hydroxyl groups-containing compounds, for furthering the adhesion to elastomeric materials. According to the invention the process is preferably so carried out that the carboxyl endgroups content of the drawn yarn is less than 18 milliequivalents per kg of yarn, more particularly 3–8 milliequivalents per kg.

An effective embodiment of the process according to the invention is characterized in that in each of the spinning orifices the polymer mass for forming the core zone of higher relative viscosity forms 50 to 90 per cent by volume, preferably about 75 per cent by volume and the polymer mass for forming the sheath zone of lower relative viscosity forms 50 to 10 per cent by volume.

The invention particularly also comprises a cord composed of two or more multifilament yarns according to the invention that are twisted together. The invention more particularly comprises a substantially polyester cord of the type used for reinforcing elastomeric and other objects, such as pneumatic tires for vehicles, transmission belts, hoses, conveyor belts and the like, which cord preferably consists of polyethylene terephthalate and is characterized in that after the treatment of the cord with a dip to improve the adhesion to elastomeric material by the afore-mentioned two-step dipping treatment and with a cord of said dtex 1100 (Z 393)×2 (S 393):
the tenacity of the cord is in the range of 450 to 850 mN/tex;
the elongation at rupture of the cord is in the range of 8 to 20%–25%, more particularly 10 to 20%;
the specific 5%-LASE of the cord is in the range of 150 to 350 mN/tex;
the hot air shrinkage measured at 180° C. is in the range of 0.5 to 6.0%, preferably 0.5–3.4%;
the Mallory Tube Fatigue value is in the range of 115 to 1000.

The invention also comprises a shaped elastomeric object, such as a pheumatic tire for a vehicle, which object is reinforced with yarns or cords according to the invention. The invention further comprises a pneumatic tire of the radial ply type for a vehicle, more particularly a passenger car, which tire is characterized in that it contains one carcass layer which is substantially formed of the cord according to the invention. the invention moreover comprises tow made from the cord according to the invention. The yarns according to the invention, particularly when they are of polyethylene terephthalate, also may advantageously be applied as sewing yarns or in the manufacture of seat belts.

As mentioned before, particularly in the high-speed spinning of polyester yarn it has surprisingly been found that when use is made of a process according to the invention the breaking strength of the yarn decreases to a lesser extent than that of high-speed yarn obtained by the conventional method and that the low hot air shrinkage is retained at high spinning speeds of, say, 4000 m/min. Also the dipped polyester cord made from the yarns according to the invention is particularly favourable because of its high modulus/shrinkage ratio in combination with the high value for the modulus and the low hot air shrinkage value of about 2.5% and a Mallory Tube Fatigue value of about 175.

Although the surprising effect of the process according to the invention cannot be fully accounted for, it is believed that this effect is particularly due to the lower value of the relative viscosity in the sheath zone of the filaments, as a result of which the more rapid cooling in said sheath zone at higher spinning speeds gives no or less rise to a difference in orientation between the sheath zone and the core zone of the filaments. In the drawing operation, which generally follows spinning, molecular orientation across the entire cross-section of the filaments can be optimal and to the same degree in the sheath zone and in the core zone. In essence the process according to the invention implies that by previously setting the magnitude of the difference in relative viscosity between the core polymer and the sheath polymer in a filament the variation in molecular orientation across the cross-section of a spun filament can be influenced. Also in the case of high polymer throughputs per spinning orifice, for instance of more than 3.5 grammes/minute, the principle of the invention, i.e. control of the variation in molecular orientation across the cross-section of the filaments, is still found to apply. Depending on the yarn properties envisaged, the process according to the invention may be so carried out that the birefringence across the cross-section of the filaments displays a deep trough (birefringence in the core is lower than that in the sheath) or a practically straight line. Alternatively, the process according to the invention may be such that the birefringence across the cross-section of the filaments displays an inverted trough (birefringence in the core higher than that in the sheath).

For a further description reference is made to FIGS. 6, 7, 8 and 9, which are schematic illustrations on a greatly enlarged scale of the orientation distribution in one spun filament 43. FIG. 6 shows a prior art filament obtained by high-speed spinning, no use being made in the spinning orifice of core and sheath zones with different relative viscosities. The filament 43 according to FIG. 6 is obtained by high-speed spinning at, say, 4000 m/min and the birefringence across the cross-section of the filament exhibits a dip 44 with a fairly deep trough on the centre line 45 of the filament. The molecular orientation, of which the birefringence is a measure, will display the same dip across the cross-section of the filament. In the outer zone of the filament according to FIG. 6 the molecular orientation is consequently very much higher than in the core of that filament. FIG. 7 is a schematic illustration of one filament 43 according to the invention, which is also obtained at a spinning speed of, say, 4000 m/min. According to the invention it contains a core zone 46 referred to by C, in which the relative viscosity is higher than in the sheath zone 47, referred to by S. The theoretical birefringence and consequently the molecular orientation across the cross-section is indicated with a full line 48. From the shape of the line 48 it appears that after the original dip in the core zone 46 of the filament the birefringence and consequently the molecular orientation abruptly decrease at the border of the sheath zone 47 of lower viscosity, after which they gradually increase again toward the outside of the filament. As compared with FIG. 6, the shape of the line in FIG. 7 shows that the difference in birefringence and molecular orientation across the cross-section of a filament is considerably reduced by the use of the process according to the invention. The broken line 49 in FIG. 7 still shows the approximate trend of the birefringence if the process of the invention is not applied.

FIG. 8 again shows one filament 43 spun by the prior art method, no core and sheath zones of different relative viscosities being used in the spinning orifice. The filament 43 according to FIG. 8 is obtained at a relatively moderate spinning speed of, say, 800 m/min. At such a moderate spinning speed cooling will be attended with only a slight temperature gradient from the core to the sheath of the filament. Therefore, the birefringence and the molecular orientation exhibit a practically linear trend 50 across the cross-section of the filament, as appears from the line 50 in FIG. 8.

FIG. 9 is a schematic illustration of one filament 43 according to the invention of a yarn also obtained at a spinning speed of 800 m/min. According to the invention there are provided a core zone 51 (C) of a higher relative viscosity and a sheath zone 52 (S) of a lower relative viscosity. Then the process is such that the birefringence and the molecular orientation in principle exhibit an elevated trend 53 across the cross-section of the filament. Such a trend of the molecular orientation across the cross-section in principle leads to a higher resistance of the yarn to bending load and fatigue, as a result of which cord losses can be reduced, a higher knot strength will be obtained and cord efficiency can be improved.

In the process according to the invention special materials may optionally be added to the sheath and/or the core of the filaments. Conceivable in this connection is the use of materials furthering the adhesion to elastomeric objects, hydrolysis stability, and light stability.

As regards the state of the art the following should be noted.

EP 0 080 906 describes a process for the manufacture of polyethylene terephthalate multifilament yarns for technical uses, such as reinforcing elastomeric objects, as examples of which may be mentioned vehicle tires, V-belts and conveyor belts. It also proposes the use in the manufacture of polyester industrial yarns of higher spinning speeds, viz. of 2000, 2500 and 3500 m/min. EP 0 080 906 proposes improving the quality of yarns spun at high speeds by using a different method, which comprises delayed cooling of the filament bundle by blowing heated air onto it of 35° to 80° C., preferably 60° to 80° C. This treatment moreover aims at reducing the difference in birefringence between the core and the sheath of the filaments. Cooling with heated air is a useful step as such in that under particular conditions it may lead to improvement of the yarn quality. But this step is applicable only to a limited extent. For, cooling with hot air is only effective in the case of relatively low throughputs per spinning orifice and certainly not in the event of throughputs higher than 3.5 g/min. In that case, notably at a spinning speed of 4000 m/min, use of the method of EP 0 080 906 results in an unduly great difference in birefringence across the cross-section of each of the filaments, so that the high strength, high modulus and low shrinkage desired for industrial yarns cannot be attained. This is also recognized in EP 0 080 906 (see page 15, lines 23-27 and p 16, lines 106). The invention provides a different method, by which the high tenacity, high modulus and low shrinkage can even be attained at spinning speeds of about 4000 m/min at a throughput per spinning orifice of, say, 4.17 g/min.

Japanese Patent Application No. 30559/1981, publication No. 149513/1983, relates to a bicomponent polyethylene terephthalate (petp) multifilament yarn of the sheath-core type, which is destined for textile uses, i.e. garments and the like, as well as for industrial uses, such as tire cord. There the core of the filaments consists of a petp type A having a higher intrinsic viscosity and hence also a higher relative viscosity than that of the petp type B forming the sheath. That publication is based on the idea of benefiting from the favourable properties of the two polymers by combining petp of a high intrinsic viscosity with that of a low intrinsic viscosity. For, petp of a higher intrinsic viscosity has in itself a higher tenacity but a lower modulus/shrinkage ratio. Petp of a lower or medium high intrinsic viscosity has in itself a better modulus/shrinkage ratio, but a lower strength. Although for certain uses and particular spinning conditions the basic idea of this Japanese patent publication may lead to favourable results, this known method is considered to lead to yarns whose strength and modulus/shrinkage ratio do not satisfy the requirements for industrial yarns. This is particularly to be attributed to the fairly great difference in intrinsic viscosity between the core and the sheath $(0.10 < \eta_A - \eta_B < 0.60)$ and will be the case at higher spinning speeds of, say, 2000–4000 m/min. It should be added that said difference in intrinsic viscosity expressed in relative viscosity approximately corresponds to $0.108 < \eta_A - \eta_B < 0.648$. According to the description this Japanese patent publications relates to spinning speeds of 100 to 1500 m/min.

Just as Japanese Application No. 30559/1981, Japanese Patent Application No. 200226/1981, publication No. 104221/1983 is based on the idea of combining in the manufacture of bicomponent filaments the advantages of the two types of petp A and B of high and low intrinsic viscosity, respectievely. It proposes providing the two petp types A and B in a multilayer structure, for instance in the form of a petal. This last-mentioned structure is considered to be less suitable for industrial uses, such as tire yarns.

It should be added that the object envisaged by the two last-mentioned Japanese patent publications (publication Nos. 149513/1982 and 104221/1984) is quite different from that of the present invention. These two Japanese patent publications relate to blending the properties, such as tenacity and modulus/shrinkage of two types of polyesters between which there is a relatively great difference in intrinsic viscosity or relative viscosity.

DE 2 747 803 describes a process for the manufacture of a petp multifilament yarn destined for industrial uses, such as automobile tires. It proposes using spinning speeds of 500 to 3000 m/min and in the process freshly extruded filaments are solidified under the spinneret by blowing cooling air countercurrently to the feed direction of the moving filaments, resulting in a fairly high drawing off tension and hence a high molecular orientation. This publication also prescribes afterdrawing the spun yarn in combination with a special heat treatment. Although under some conditions this known method does lead to some improvements, this known method is considered to have the disadvantage that very often there will be relatively great differences between the inside and the outside of the filaments, so that particularly the strength of the yarn and of the cord cannot be optimal.

U.S. Pat. No. 3,963,678 describes a process for the manufacture of polyester monofilaments destined for reinforcing tires, V-belts and for use in other industrial fields. Melt spinning is carried out in the manner usual for monofilaments by spinning into an air gap followed by cooling in a water bath. In order to obtain filaments having improved loop strength and lower birefringence in the sheath of the filaments a special two-step drawing process is proposed in combination with a heat treatment in an oven at a temperature of about 500° to 600° C. As a result, the outside of the monofilament will have a far higher temperature than the core. The process according to U.S. Pat. No. 3,963,678 is not suitable for use on multifilament yarns because the filaments would stick together, which is unacceptable.

U.S. Pat. No. 4,195,051 and U.S. Pat. No. 4,134,882 relate to the high-speed spinning of polyester multifilament yarn at speeds of about 5000 to 7500 m/min, a small difference in birefringence being provided between the sheath and the core in each of the filaments. The small difference in birefringence may be brought about by taking care that the temperature of the polymer at the wall of each spinning orifice is at least 5° C. higher than the average temperature of the polymer in the spinning orifices. This process is to be used for the manufacture of multifilament yarns for textile uses and notably has for its object the enhancement of the dyeability of textile yarns. This known process also provides a good starting yarn for the texturing process often applied to textile yarns.

EP 0 056 667 describes a process for the manufacture of a bicomponent multifilament yarn for technical uses, such as tows and fishing nets. It is concerned with the manufacture in the first place of black yarns, of which the black pigment is present in the form of insoluble carbon black particles. To stop excessive wear of costly machine parts as a result of the presence of these pigments in the surface of the filaments a pigment-free sheath is provided around the pigment-containing core of each filament, which is of particular advantage in the case of spindrawing. In the process according to EP 0 056 667 the object envisaged is totally different from that of the present invention. The resulting yarn is composed of filaments which show a difference in pigment content between the core and the sheath. Moreover, use is made of a relatively low spinning speed of 400 m/min. It should be added that this publication happens to contain an example (see Table 1, test 6) which mentions filaments having a black pigment-containing core and a pigment-free sheath of petp of relative viscosities of 1.89 and 1.85, respectively.

NL 6 817 305 relates to a process for the manufacture of multifilament polyester yarns for textile uses. The polymer is divided into two part streams and to one of the part streams a special liquid, such as polyglycol, is added which reacts with the polymer and changes its intrinsic viscosity. The part streams are subsequently re-combined and spun into a bicomponent multifilament yarn made up of filaments of the side-by-side or, as in Example IX, of the sheath-core type. In the only example (IX) mentioning the sheath-core type filaments the petp of the lower intrinsic viscosity is in the core and the petp of the higher intrinsic viscosity is in the sheath, which situation is the very opposite to that of the present invention. Further, NL 6 817 305 relates to yarns for textile uses, as appears from the low values of the intrinsic viscosities, viz. 0.50–0.61, which approximately correspond to relative viscosities of 1.50–1.61, respectively.

Japanese Patent Application No. 61912/1966, publication No. 21170/1969, relates to a polyester bicomponent yarn of the sheath-core type, of which the sheath and the core may be of petp. The sheath or core of the filaments has an intrinsic viscosity which is at least 0.05 smaller than that of the core. The process of this patent disclosure only has for its object to subject the low-viscous sheath to super drawing, i.e. drawing without orientation, as a result of which the sheaths of the separate filaments will stick together, so that the multifilaments can be processed as monofilament during wearing or knitting. In the fabric the low-viscous sheaths of the filaments are re-separated and a multi-filament is formed again. In the examples mention is only made of low intrinsic viscosities of 0.60–0.66, which are unsuitable for industrial yarns, such as tire yarns.

Japanese Patent Application No. 4575/1976, Publication No. 88678/1977 describes a petp yarn having a low-viscous sheath and a high-viscous core for the manufacture of non-woven fabrics of bonded filaments. Using a relatively low viscosity in the core will result in a processing temperature at which in the deposited web the low-viscous sheaths will melt and stick together, whereas the cores will not melt. The aim is to bring about a greatest possible difference in orientation between the sheath and the core in order to realize a difference in melting point between the sheath and the core. This is the very opposite to the result envisaged by the present invention, viz. the use of low-viscous polymer in the sheath to remove the difference in orientation between the sheath and the core during melt spinning or to impart a somewhat lower molecular orientation to the sheath at low-speed spinning at a rate of, say 600 m/min. The examples give very great differences in birefringence, which are unacceptable for the manufacture of the industrial multifilament yarns of the invention.

Japanese Patent Application No. 173798/1982, publication No. 66507/1984 describes an ultra high-speed spinning method for manufacturing petp textile yarn of which the skin (intrinsic viscosity 0.45–0.55) has a lower viscosity than the core ($\eta_{inh}$=0.60). Use is to be made of a spinning speed higher than 6000 m/min and the yarn is to be taken up within a distance of 1 meter below the spinneret. The object is the ultra high-speed manufacture of textile yarn that will have about the same yarn properties as yarns spun at low speeds and subsequently drawn. Under the spinning conditions prescribed in said publication it is not possible to process a high-viscous polymer into an industrial yarn.

Japanese Patent Application No. 173799/1982, publication No. 66508/1984, describes a method of processing a low-viscous polymer ($\eta_{inh}=0.63$) into a textile yarn at high spinning speeds (>3000 m/min). By heating the spinneret to a temperature which is about 100° C. higher than the temperature of the polymer, the differences in orientation between the sheath and the core may be reduced and spinning can be carried out at such a high speed that without after-drawing a textile yarn is obtained which has the same properties as a textile yarn spun at low speed and subsequently drawn. This well-known method does not relate to the manufacture of industrial yarns of the type with a high intrinsic or relative viscosity, no mention being made either of any difference in intrinsic or relative viscosity between the sheath and the core of the filaments.

Japanese Patent Application No. 15784/1983, publication No. 144615/1984, describes a method of improving the linear strength and the knot strength of thick polyamide monofilaments used for fishing lines and fishing nets. When spinning thick polyamide monofilaments, which are cooled in a water bath, there will be great differences in molecular orientation between the sheath and the core. By using a less viscous polymer for the sheath of the polymer a more uniform molecular orientation will be obtained and hence a higher tensile strength and knot strength. This publication does not make any reference to a method according to the present invention of spinning a polyester multifilament yarn.

NL 6 502 107 describes a method for spinning crimpable filament yarns of polyamide, polyester or the like. The molten polymer is divided into two part streams, after which one of the part streams is given a speed which is 1.5 to 4 times as high as that of the other part stream. The part streams are re-combined and spun into a bicomponent yarn. The difference in the flow rate of the spinning mass within one and the same spinning orifice will give rise to a difference in pre-orientation of the components while the filaments are being drawn off. This known process is destined for textile uses, such as the manufacture of crimped yarns.

NL 6 910 882 relates to a process for the manufacture of crimped staple fibres of polyamide-6. The melt is divided into two part streams, one of which is subjected to a vacuum treatment, resulting in a change in relative viscosity. The part streams are re-combined and spun into a bicomponent yarn. This process is destined for textile uses, such as the manufacture of crimped staple fibres.

Mention should also be made of NL 6 512 920, which describes a bicomponent tire yarn of the sheath core type, the core and the sheath consisting of chemically different polymers. The core is of polyester and the sheath of nylon. In this known process the spinning speed is as low as 300 m/min.

DE 1 288 734 describes a process for melt spinning a petp filament yarn destined for industrial uses, such as reinforcing elastomeric objects. In said publication (see column 4, lines 33-64) it is proposed that the thread bundle should be subjected to delayed cooling immediately below the spinneret by means of an appropriate heating device, such as a hot tube. This publication relates to spinning speeds below 500 m/min.

Reference is also made to DE 1 803 435, NL 6 807 158, GB 1 157 433 and Japanese Patent Application No. 64837/66, publication No. 2504/69, which describes methods of manufacturing crimped textile yarns from polyester. Per spinning orifice polyesters of different relative or intrinsic viscosities are spun in accordance with the bicomponent system. The resulting filaments are of the eccentric sheath-core or side-by-side type.

DE 32 26 346 gives a description of a polyester tire cord and makes mention of the cord properties after vulcanization in a tire. From the text it appears that the cord is manufactured from a normal fast spun polyester yarn spun at a speed higher than 2000 m/min. It does not disclose the use of a difference in viscosity between the sheath and the core. In the manufacture of cord according to the process of the present invention the resulting cord properties are in some respects more favourable than those obtained in accordance with DE 32 26 346.

DE 32 07 826 is directed to protecting a pneumatic tire of which the carcass is reinforced with polyester cord. A specification is given of various properties of the cord and of the filaments of the yarn. More particularly, it is required that in the polyester filaments the ratio of birefringence of sheath and core should be between 1.03:1 and 1.15:1 and should consequently display a dipshaped profile in order that the desired cord properties may be obtained. Use being made of a higher viscosity in the core than in the sheath, the present invention envisages a decrease in the ratio of birefringence mentioned in DE 32 07 826 to below 1.03.

EP 0 056 963 describes a polyester yarn for which a difference in birefringence between the sheath and the core is described in the range of 100 to $800 \times 10^{-4}$, more particularly 100 to $400 \times 10^{-4}$. Use being made of said difference in viscosity between the sheath and the core of the filaments, application of the process according to the invention results in said difference in birefringence between the sheath and the core becoming smaller than $100 \times 10^{-4}$. According to the present invention it is preferred that the difference in birefringence between the sheath and the core in a filament should become somewhat negative (the birefringence across the cross-section of a filament displaying an inverted dip), which is more favourable and leads to better cord properties. EP 0 056 963 further prescribes that of the yarn the peak temperature of the tangent of the loss angle should be between 85° and 110° C., which is desirable in the case of fast spun yarns for textile uses. With the yarns according to the invention, which are destined for industrial uses, said peak temperature is above 115° C. Moreover, with the yarns according to EP 0 056 963 the maximum of the loss tangent must be between 0.115 and 0.135, which is required for textile yarns. With the industrial yarns according to the invention, the maximum of said loss tangent is below 0.100.

The invention will be further described with reference to the accompanying schematic drawing.

FIG. 1 shows the melt spinning apparatus.

FIG. 3 is a cross-sectional view of the polymer stream in one spinning orifice.

FIG. 4 shows a cord.

FIG. 5 shows a detail of a pneumatic tire for a vehicle.

Figure 2:
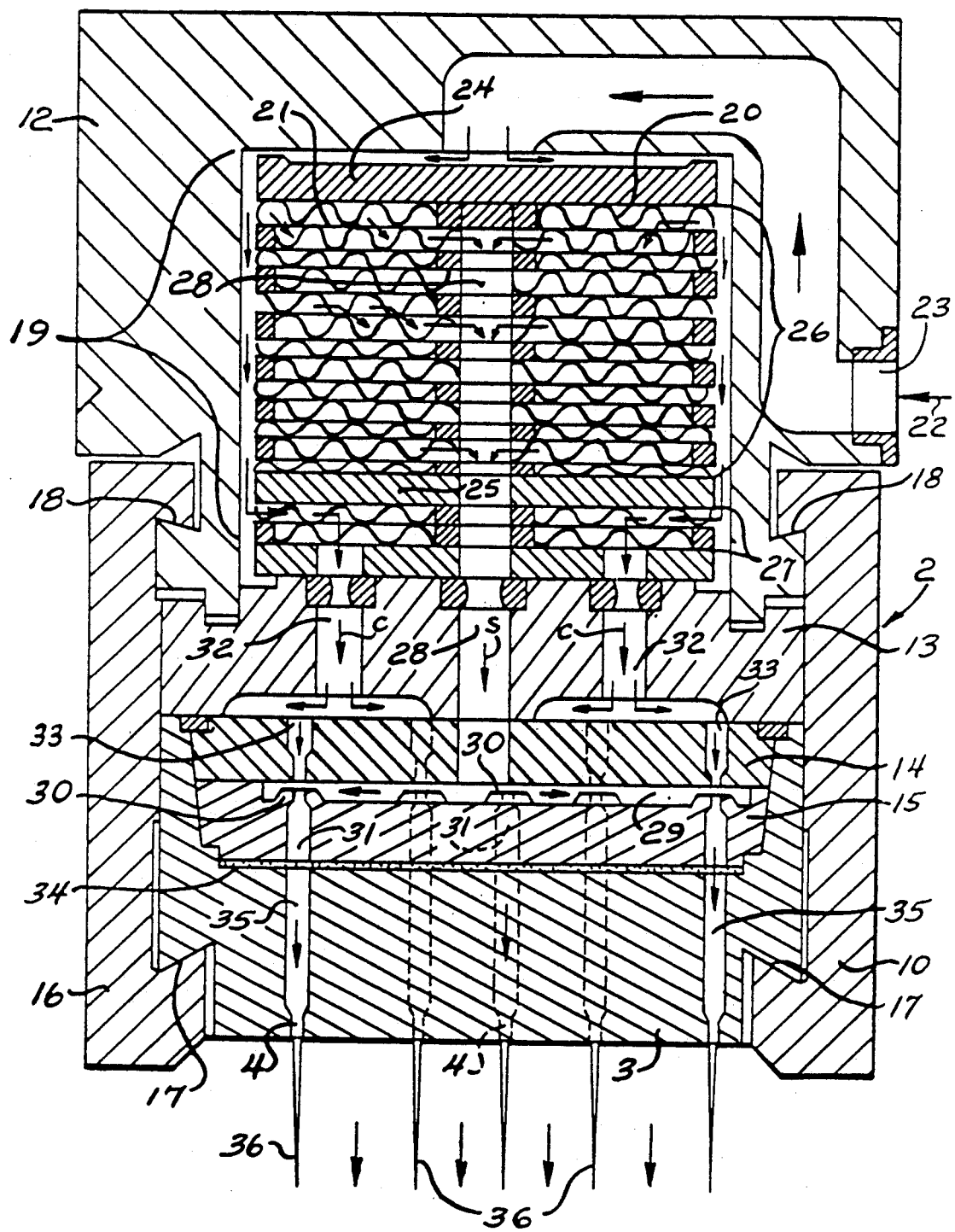
FIG. 2 is a view on a larger scale of a spinning assembly.
Figure 6:
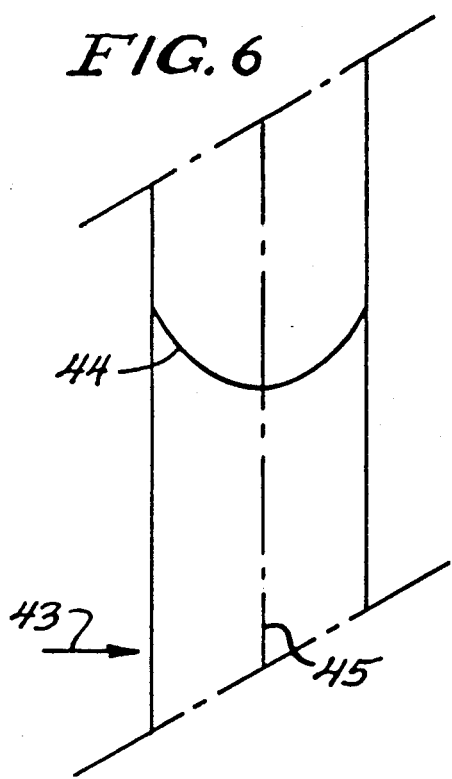
FIGS. 6, 7, 8 and 9 are views on a strongly enlarged scale of one filament and the birefringence across its cross-section.
Figure 7:
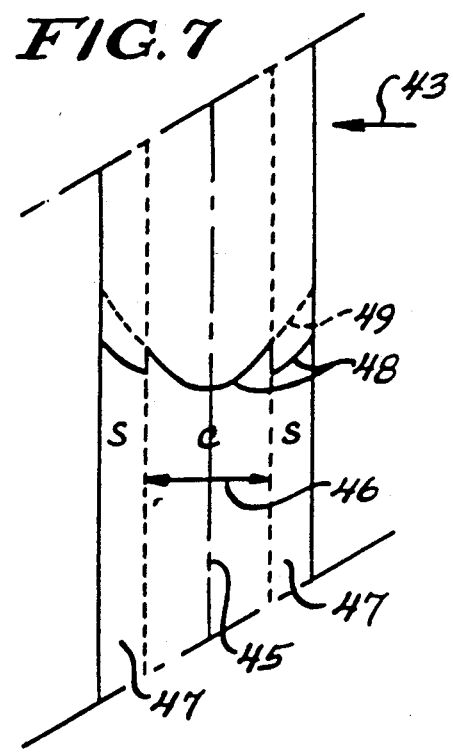
Figure 8:
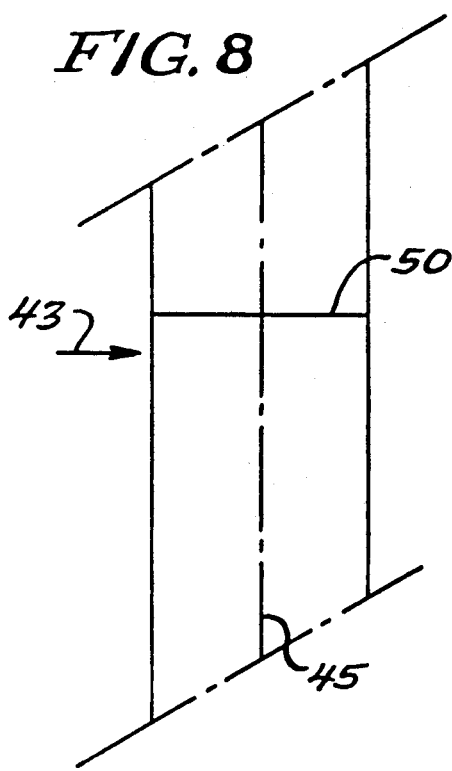
Figure 9:
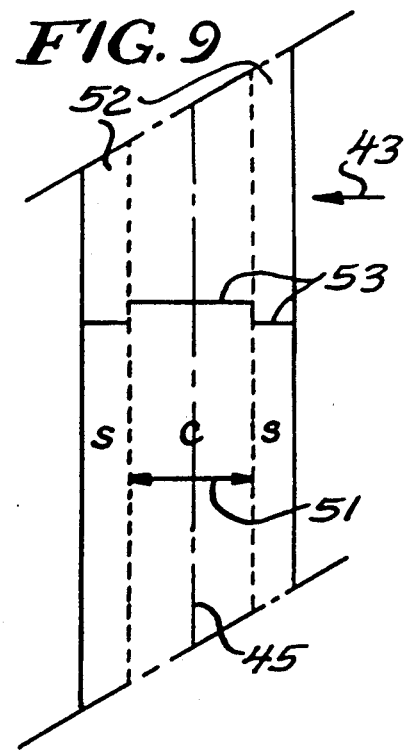

FIG. 1 is a simplified schematic representation of the process of melt spinning the multifilament yarn according to the invention. Through an extruder (not shown) the molten polymer is fed under high pressure to the heated housing 1 which accommodates the spinning assembly 2 consisting of several parts and shown on a larger scale in FIG. 2. The molten polymer is forced through a large number of spinning orifices 4 provided in a spinneret 3 which is rectangular when viewed from underneath. The filaments emerge from the spinneret 3 as a bundle 5. The filament bundle 5 is passed through a schematically illustrated blow box 6, in which the bundle is cooled with air of room temperature, which is blown onto the filaments transverse to the direction of movement of the bundle in the direction indicated by the arrows 7. The filament bundle 5 is subsequently brought into contact with the finish metering unit 8 in which a suitable lubricant is applied to the filaments of the bundle in the usual way. Then the multifilament bundle arrives at the first of a set of advancing rolls 9 and 10 for imparting the correct speed to the yarn bundle. The circumferential speed of the driven roll 9 is determinative of the speed at which the filaments are spun and is therefore referred to as the spinning speed. After the spun multifilament yarn has left the roll 10, it is wound into a package 11. The speed at which the yarn is wound will be approximately equal to the spinning speed. After the yarn has been taken up, it is drawn on a separate machine (not shown) at the desired ratio. In principle, however, drawing also may be carried out on the spinning machine in a continuous spindrawing process. In the event of the spindrawing process known per se being applied a drawing device (not shown) consisting of one or more driven rolls is to be provided between the first driven roll 9 and the winding bobbin.

The spinning assembly 2 shown in FIG. 2 substantially consists of an upper block 12, an intermediate plate 13 and a spinneret plate 3. In the space between the intermediate plate 13 and the spinneret plate 3 are partitions 14 and 15. The various parts 12, 13, 3, 14 and 15 are held together by clamping walls 16 provided with lower and upper grooves 17 and 18 for making an interlocking dovetail joint with corresponding grooves of the spinneret plate 3 and the upper block 12. In operation of the spinning assembly its various parts are tightly clamped and held together by the high pressure of, say, 200 bar, exerted by the molten polymer. The assembly is properly sealed with packing material. Filtration of the polymer in the spinning assembly is through a parallel filter 19. The parallel filter 19 substantially consists of a stack of alternating course mesh supporting gauzes 20 indicated by sinuous lines and filter gauze packs 21. The supporting gauzes are sealed alternately on their outer circumference and on their inner circumference. The construction and the operation of the parallel filter are known in themselves and described in greater detail in U.S. Pat. No. 4 361 489.

To the upper block 12 of the spinning assembly 2 there is fed one single molten polymer, for instance: polyethylene terephthalate, to the inlet channel 23 in the direction indicated by the arrow 22. The polymer then flows to the upper plate 24 which covers the upper side of the parallel filter 19 and, via constrictions, exerts the desired axial pressure on the parallel filter. The polymer subsequently flows downwards through the space between the outer circumference of the filter and the upper block 12 and simultaneously in horizontal direction through the supporting gauzes 20 and then through the filter gauze packs 21, as indicated by arrows.

In view of the special method according to the invention the parallel filter 19 is divided into two parts 26 and 27. The polymer, referred to by the letter S, which is filtered through the upper part 26 of the parallel filter is in the way indicated by arrows fed via the central channel 28 to the space 29 between the upper partition 14 and the lower partition 15. Via the constrictions 30 the polymer S flows over the upper side of the partition 15 into the channels 31 which are positioned in a direct line with the spinning orifices 4 in the spinneret plate 3. The polymer, referred to by the letter C, which is filtered through the lower part 27 of the parallel filter passes downwards through the channels 32 and 33 as indicated by arrows and in such a way that the polymer streams C flow exactly into the centre of the channels 31. Thus the polymer streams S and C flow into the channels 31 in a concentrical sheath (S)-core (C) arrangement. Via the auxiliary gauze 34 the concentrical polymer streams of the channels 31 pass to the widened inlet channels 35 of the spinning orifices 4 which end in the lower side of the spinneret plate, after which the polymer streams are forced outwards in the form of threads 36. After the filaments 36 have been cooled, they form the filament yarn bundle 5. Since according to the invention the core polymer C, which is filtered through the lower part 27 of the parallel filter, has a shorter residence time than the sheath polymer S, which is filtered through the upper part 26 of the parallel filter, the polymer stream C upon reaching the spinning orifices 4 will have a higher relative viscosity than the polymer stream S. As a result, in each spinning orifice 4 there will form a polymer stream of one and the same polymer, more particularly of polyethylene terephthalate, which displays two concentrical zones, viz. a sheath (S) zone and a core (C) zone, the relative viscosity of the core zone being higher than that of the sheath zone. A cross-sectional view of the polymer stream at the location of the spinning orifices 4 is given in FIG. 3, the boundary between the core zone C with higher relative viscosity and the sheath zone S with lower relative viscosity being indicated by a broken line.

It should be added that the difference in relative viscosity between the polymer streams in the sheath and in the core can in principle be measured in a simple manner by spinning two filaments, of which the one filament is entirely formed of the polymer stream S and the other filament is entirely formed of the polymer stream C. This may be realized by closing a channel 33 in one place and one constriction 30 around another channel in some other place. Subsequently, of each the two filaments, i.e. of the one from the sheath polymer stream S and of the one from the core polymer stream C, the relative viscosity can be separately determined.

FIG. 4 is a perspective view on a very much enlarged scale of a cord 37 made from two or more multifilament yarns according to the invention. In the case of a cord of two multifilament yarns these yarns each have a high Z-twist of a few hundred turns per meter. The cord is made from these yarns by twisting the two z-twisted yarns together to the same degree but in opposite (S) direction. A common type of cord is the cord referred to as dtex 1100 (Z 393)×2(S 393). This type of cord is formed from two multifilament yarns which each have a linear density of decitex 1100 and a Z-twist of 393 turns per meter. The two Z-twisted yarns are twisted together in S direction into a cord having 393 turns per meter.

In an adapted construction or in the form of a fabric the cord 37 may be used for reinforcing elastomeric objects, such as the vehicle tire 37, of which a detail is shown in FIG. 5. The cords may be incorporated into the carcass, which in this case consists of one layer 39, and/or into one of the two belt strips 40 and 41 underneath the tread 42 of the tire 38.

The afore-mentioned birefringence across the cross-section of a filament is measured with an Interphako interference microscope. The measurement of the birefringence, which is a measure of the molecular orientation, is conducted in the manner described in "Handbuch der Mikroskopie, Beyer, VEB Verlag Technik, Berlin, 1973".

The properties referred to in the description and the claims, such as linear density, tenacity, breaking strength of yarn and cord, the 5%-LASE (Load at specified elongation) and the specific 5%-LASE of yarn and cord, the elongation at rupture of yarn and cord, and the hot air shrinkages at 160° C. and 180° C. of yarn and cord, respectively, were determined in accordance with ASTM D 885 M-1979. In deviation from these test instructions the hot air shrinkage was measured at 180° C. at a pretension of 1 N/tex. The Mallory Tube Fatigue value was determined in accordance with ASTM D 855-1967. In this Mallory Tube Fatigue test the average running time to rupture was measured both of the test specimens of yarns according to the invention (see Tables 1 and 2, Example 1, Experiments B, C and D and Example 2, Experiments F, G and H and of the commercially available polyester yarn Diolen 2000 (see Table 1, Experiment A) and Diolen 2200 T (see Table 2, Experiment E). With the measured running time to rupture of the standard Diolen 2000 sample being $x_0$ and the measured running time to rupture of a yarn according to the invention being $x_n$, the result of the formula $$\frac{x_n}{x_0} \times 100$$

is taken for the Mallory Tube Fatigue value.

The term modulus as used in the description refers to the 5%-LASE corrected for the total linear density of the yarn or cord expressed in mN/tex. This corrected 5%-LASE is referred to as the specific 5%-LASE.

By the term relative viscosity of polyester used in the present description and claims, also referred to as viscosity ratio or solution viscosity and indicated by $\eta_{rel}$, is to be understood the relative viscosity determined on the spun product. By spun product is to be understood the freshly extruded, undrawn and totally non-treated filaments which moreover are free of finish. Of that spun product the relative viscosity is measured in accordance with the following procedure: 1 gramme of spun product is dissolved, with stirring, in 100 grammes of meta-cresol (purity higher thant 99.5%) at 125° C. over a period of not more thant 40 minutes. Of the resulting solution the viscosity, i.e. the flow time $t_1$ in seconds, is measured at 25° C. in an Ubbelohde viscosimeter with a capillary having an internal diameter of 1.25 mm, and compared with the flow time $t_0$ in seconds of the pure solvent measured in the same meter. The relative viscosity can be calculated then with the formula $$\eta_{rel} = \frac{t_1}{t_0}.$$

If the spun product is so crystalline that it does not dissolve in meta-cresol after 40 minutes at 125° C., the solvent used will be a mixture (referred to as TCFF) of 2,4,6-trichlorophenol and phenol in the mass ratio of about 7:10 and with a density $d_{25} = 1.236 \pm 0.001$. Further, the TCFF viscosity is determined in the same way as described hereinbefore. The TCFF viscosity thus obtained is to be converted into the relative viscosity measured in meta-cresol using the formula $\eta_{rel} = 0.808 \cdot x + 0.198$, wherein x is the measured TCFF viscosity.

The standard deviation of the $\eta_{rel}$ measurement in meta-cresol is 0.002.

The standard deviation of the $\eta_{rel}$ obtained with the TCFF mixture as solvent is 0.004.

For demonstrating very small differences in relative viscosity the standard deviation may optionally be reduced by conducting several measurments and calculating $\eta_{rel}$ as the average of these measurements.

The invention will be further described in the following example.

EXAMPLE 1

Polyethylene terephthalate is spun on a machine for producing bicomponent yarns, use being made of two extruders which are each fed with the same type of granules of the same relative viscosity ($\eta_{rel} = 2.05$ measured on the granules). The freshly spun filaments pass through an isolation zone before being cooled by blowing air of a temperature equal to the ambient temperature. Subsequently, the yarns are passed over two godets and thereupon taken up. Further spinning data are given in Table 1. According to the invention (see Experiments B, C, D) the yarns are assembled twofold and subsequently subjected to a twostep drawing operation. The first drawing step is on 7 pins 21 cm in diameter and of a temperature of 80° C. Then the yarns are subjected to a second drawing step in a steam drawing frame 10 m long at a steam temperature of 256° C. and subsequently taken up at a speed of 226 m/min. Further data on the drawing process and the properties of the drawn yarns in the Experiments A, B, C and D are given in Table 1. The drawn yarns are twisted and formed into a tire cord of the dtex 1100 (Z393)×2(s393) improve the adhesion to elastomeric material the greige cords are subjected to a two-step dipping treatment. The properties of the dipped cord are mentioned in Table 1. The two-step dipping treatment of the cord according to the invention is carried out using the following procedure know per se. In a continuous process the cord of the dtex 1100 (Z393)×2(s393) type is passed through a first bath in which it is pre-dipped and then through a second in which it is provided with a main dip. Between the first and the second bath cord is dried for 60 seconds at a temperature of 240° C. and under a tension of 10N. After the main dip has been applied, the cord after it has left the second bath is dried again for 120 seconds at 220° C. and under a tension of 4.5N. The first dip bath of a temperature of about 20° C. for applying the pre-dip (type D 417) has a solids content of 5% by weight and the composition of the first dip bath is as follows:

| | | |
|---|---|---|
| o | demineralized water | 876.4 parts by weight |
| o | gum tragacanth (2% by weight solution in water) | 20.0 parts by weight |
| o | 4,4'-diphenylmethane diisocyanate blocked with phenol (40% by weight dispersion in water) (commercially available from the firm of Uniroyal Chemical under the designation LVBI) | 90.0 parts by weight |
| o | diglycidyl ether of glycerol | 13.6 parts by weight |

-continued

| | |
|---|---|
| (commercially available from the firm of Nagase under the designation NER-010A) | 1000.0 parts weight |

The amount of pre-dip present on the completed, two-step dipped cord after dipping is 0.5-1% by weight.

The second dip bath (temperature also about 20° C.) for applying the main dip (type RFL-D5 A) has a solids content of 20% by weight and the composition of the second dip bath is as follows:

| Resin group | |
|---|---|
| o precondensated resorcinol formaldehyde resin (75% by weight solution in water) | 28.6 parts by weight |
| o sodium hydroxide (5% by weight solution in water) | 12.0 parts by weight |
| o formalin (37% by weight solution in water) | 20.8 parts by weight |
| o demineralized water | 370.0 parts by weight |
| Latex group | |
| o vinyl-pyridine latex (40% by weight dispersion in water) (commercially available from the firms of General Tire and Goodyear under the designation Gentac VP-latex) | 415.4 parts by weight |
| o ammonium hydroxide (25% by weight solution in water) | 25.0 parts by weight |
| o demineralized water | 128.2 parts by weight |
| | 1000.0 parts by weight |

The amount of main dip present on the completed, two-step dipped cord after it has been dipped is 3-4% by weight. As to Experiment A the spinning and drawing conditions and the properties are given for a yarn conventionally (mono) spun at low speed, i.e. without any difference in relative viscosity between the sheath and the core of the filaments.

The experiments B, C and D were carried out in accordance with the invention, i.e. the sheath and the core having different relative viscosities, at spinning speeds of 500, 2000 and 4000 m/min, respectively.

In the experiments B, C and D the relative viscosity of the core polymer, measured on the spun product, was 0.010 to 0.030 higher than that of the sheath polymer). In the experiments B and C the relative viscosity mentioned in Table 1 is the average viscosity of the sheath polymer and the core polymer in the filaments, also measured on the spun product.

The most striking are the dipped cord properties of Experiment D. According to the invention a dipped cord is obtained here having a strength equal to that obtained at low speeds, an improved modulus or specific 5%-LASE combined with a far lower shrinkage (i.e. excellent modulus/shrinkage ratio) and also an improved fatigue resistance (Mallory Tube Fatigue).

TABLE 1

| | A | B | C | D |
|---|---|---|---|---|
| Spinning | | | | |
| Polymer temperature (°C.) core/sheath | 300 | 300/300 | 300/300 | 300/300 |
| Volume ratio (core/sheath) | — | 75/25 | 75/25 | 75/25 |
| Throughput per orifice (gr/min) | 1.72 | 1.64 | 3.28 | 4.17 |
| Number of spinning orifices | 192 | 104 | 104 | 104 |
| Distance between spinneret and first blowing point (cm) | 57 | 57 | 57 | 57 |
| Blow air speed (cm/sec) | 40 | 50 | 50 | 50 |
| Spinning speed (m/min) | 500 | 500 | 2000 | 4000 |
| Mean rel. viscosity (spun product) | 1.880 | 1.833 | 1.865 | — |
| Birefringence × $10^4$ | 15 | 17 | 183 | 680 |
| Drawing | | | | |
| Drawing temperature (°C.) | 235 | 256 | 256 | 256 |
| Draw ratio | 6.06 | 6.0 | 3.3 | 2.05 |
| Yarn properties | | | | |
| Linear density (dtex) | 1100 | 1224 | 1112 | 1172 |
| Number of filaments | 192 | 208 | 208 | 208 |
| Tenacity (mN/tex) | 830 | 781 | 765 | 758 |
| Elongation at rupture (%) | 10.7 | 11.3 | 10.6 | 8.8 |
| Spec. LASE-5% (mN/tex) | 345 | 405 | 381 | 405 |
| Hot air shrinkage 4 min. at 160° C. | 5.7 | 4.8 | 3.4 | 2.7 |
| Dipped cord properties | | | | |
| Tenacity (mN/tex) | 595 | 564 | 587 | 595 |
| Elongation at rupture (%) | 13.2 | 14.2 | 13.0 | 12.8 |
| Spec. LASE-% (mN/tex) | 221 | 203 | 221 | 233 |
| Hot air shrinkage 4 min. at 180° C. (%) | 5.4 | 5.0 | 3.3 | 2.5 |
| Modulus/shrinkage ratio | 40.9 | 40.6 | 67.0 | 93.2 |
| Mallory Tube Fatigue test | | | | |
| Relative running time | 100 | 243 | 116 | 215 |
| Tube temperature (°C.) | 96 | 82 | 86 | 65 |

EXAMPLE 2

Polyethylene terephthalate is spun on a machine for producing bicomponent yarns and subsequently drawn under the conditions mentioned in Example 1. In the Experiments F, G and H according to the invention, however, the volume ratio core/sheath is 60/40. All the other spinning, drawing and cord treatment conditions are identical with those of Example 1. Experiment E is not in accordance with the invention and therefore no difference in viscosity between the sheath and the core is applied. In the Experiments F, G and H in accordance with the invention the relative viscosity in the spinning orifices of the polymer in the core, measured on the spun product, was 0.010 to 0.030 higher than that of the polymer in the sheath. In the Experiments F, G and H the relative viscosity mentioned in Table 2 is the average viscosity of the sheath polymer and the core polymer in the filaments, also measured on the spun product.

The most striking are the favourable properties obtained in experiment H; namely in spite of the high spinning speed (4000 m/min) the product obtained displays a low loss of cord strength in combination with a high spec. LASE-5% (246 mN/tex), very low shrinkage (2.3%) and an excellent Mallory Tube Fatigue value (185).

TABLE 2

|  | E | F | G | H |
|---|---|---|---|---|
| Spinning | | | | |
| Polymer temperature (°C.) core/sheath) | 300 | 300/300 | 300/300 | 300/300 |
| Volume ratio (core/sheath) | — | 60/40 | 60/40 | 60/40 |
| Throughput per orifice (gr/min) | 1.72 | 1.41 | 3.06 | 3.74 |
| Number of spinning orifices | 192 | 109 | 109 | 109 |
| Distance between spinneret and first blowing point (cm) | 57 | 57 | 57 | 57 |
| Blow air speed (cm/sec) | 40 | 50 | 50 | 50 |
| Spinning speed (m/min) | 500 | 500 | 2000 | 4000 |
| Mean rel. viscosity (spun product) | 1.88 | 1.87 | 1.91 | 1.91 |
| Birefringence × $10^4$ | 15 | 22 | 187 | 721 |
| Drawing | | | | |
| Drawing temperature (°C.) | 230 | 256 | 256 | 256 |
| Draw ratio | 6.0 | 6.0 | 3.16 | 2.00 |
| Yarn properties | | | | |
| Linear density (dtex) | 1100 | 1067 | 1131 | 1100 |
| Number of filaments | 192 | 218 | 218 | 218 |
| Tenacity (mN/tex) | 831 | 799 | 777 | 734 |
| Elongation at rupture (%) | 11.9 | 9.9 | 9.8 | 8.5 |
| Spec. LASE-5% (mN/tex) | 318 | 403 | 389 | 436 |
| Hot air shrinkage 4 min. at 160° C. | 5.3 | 4.7 | 3.6 | 2.8 |
| Dipped cord properties | | | | |
| Tenacity (mN/tex) | 624 | 596 | 562 | 596 |
| Elongation at rupture (%) | 12.8 | 11.8 | 11.6 | 12.2 |
| Spec. LASE-% (mN/tex) | 236 | 232 | 220 | 246 |
| Hot air shrinkage 4 min. at 180° C. (%) | 4.9 | 4.4 | 3.2 | 2.3 |
| Modulus/shrinkage ratio | 48.2 | 52.7 | 68.8 | 107.0 |
| Mallory Tube Fatigue test | | | | |
| Relative running time | 100 | * | * | 185 |
| Tube temperature (°C.) | 114 | * | * | 100 |

*not measured

We claim:

1. A substantially polyester drawn filament yarn composed of at least 15 filaments having a core zone surrounded by a sheath zone, said filaments having
   a. a linear density of at least decitex 70;
   b. a tenacity of 735–1,000 mN/tex;
   c. a specific 5% -LASE higher than 375 mN/tex;
   d. a hot air shrinkage measured at 160° C. of 0.5–3.7%;
   e. an average relative viscosity of 1.700 to 2.200; and
   f. an elongation at rupture of 5 to 20 percent.

2. A cord formed of a plurality of twisted filament yarns, wherein the yarns are substantially polyester drawn filament yarns composed of at least 15 filaments having a core zone surrounded by a sheath zone, said filaments having
   a. a linear density of at least decitex 70;
   b. a tenacity of 735–1,000 mN/tex;
   c. a specific 5%-LASE higher than 375 mN/tex;
   d. a hot air shrinkage measured at 160° C. of 0.5–3.7%;
   e. an average relative viscosity of 1.700 to 2.200; and
   f. an elongation at rupture of 5 to 20 percent.

3. A shaped elastomeric object wherein the object is reinforced with a cord formed of a plurality of twisted filament yarns, wherein the yarns are substantially polyester drawn filament yarn composed of at least 15 filaments having a core zone surrounded by a sheath zone, said filaments having
   a. a linear density of at least decitex 70;
   b. a tenacity of 735–1,000 mN/tex;
   c. a specific 5%-LASE higher than 375 mN/tex;
   d. a hot air shrinkage measured at 160° C. of 0.5–3.7%;
   e. an average relative viscosity of 1.700 to 2.200; and
   f. an elongation at rupture of 5 to 20 percent.

4. A pneumatic tire of the radial ply type for a vehicle wherein the tire contains a single carcass layer which is substantially formed of a cord formed of a plurality of twisted filament yarns, wherein the yarns are substantially polyester drawn filament yarn composed of at least 15 filaments having a core zone surrounded by a sheath zone, said filaments having
   a. a linear density of at least decitex 70;
   b. a tenacity of 735–1,000 mN/tex;
   c. a specific 5%-LASE higher than 375 mN/tex;
   d. a hot air shrinkage measured at 160° C. of 0.5–3.7%;
   e. an average relative viscosity of 1.700 to 2.200; and
   f. an elongation at rupture of 5 to 20 percent.

5. A sewing yarn composed of one or more substantially polyester drawn filament yarns each composed of at least 15 filaments having a core zone surrounded by a sheath zone, said filaments having
   a. a linear density of at least decitex 70;
   b. a tenacity of 735–1,000 mN/tex;
   c. a specific 5%-LASE higher than 375 mN/tex;
   d. a hot air shrinkage measured at 160° C. of 0.5–3.7%;
   e. an average relative viscosity of 1.700 to 2.200; and f. an elongation at rupture of 5 to 20 percent.

6. A seat belt composed of a substantially polyester drawn filament yarn composed of at least 15 filaments having a core zone surrounded by a sheath zone, said filaments having
   a. a linear density of at least decitex 70;
   b. a tenacity of 735–1,000 mN/tex;
   c. a specific 5%-LASE higher than 375 mN/tex;
   d. a hot air shrinkage measured at 160° C. of 0.5–3.7%;
   e. an average relative viscosity of 1.700 to 2.200; and
   f. an elongation at rupture of 5 to 20 percent.

7. A tow rope composed of a cord formed of a plurality of twisted filament yarns, wherein the yarns are substantially polyester drawn filament yarn composed of at least 15 filaments having a core zone surrounded by a sheath zone, said filaments having
   a. a linear density of at least decitex 70;
   b. a tenacity of 735–1,000 mN/tex;
   c. a specific 5%-LASE higher than 375 mN/tex;
   d. a hot air shrinkage measured at 160° C. of 0.5–3.7%;
   e. an average relative viscosity of 1.700 to 2.200; and
   f. an elongation at rupture of 5 to 20 percent.

* * * * *